Nov. 4, 1958 J. N. ALDINGTON 2,859,393

ELECTRIC SEMI-CONDUCTOR DEVICES

Filed Dec. 20, 1954

Inventor
JOHN NORMAN ALDINGTON
By
Robert B Larson
Attorney

United States Patent Office 2,859,393

Patented Nov. 4, 1958

2,859,393

ELECTRIC SEMI-CONDUCTOR DEVICES

John Norman Aldington, Preston, England, assignor, by mesne assignments, to Siemens Edison-Swan Limited, a British company Application December 20, 1954, Serial No. 476,497

2 Claims. (Cl. 317—235)

This invention relates to electric semi-conductor devices of the kind in which two or more electrodes make contact with a crystal which is commonly germanium but which may be of other metal having properties suitable for use in a semi-conductor device.

One of the problems encountered in the manufacture of such devices is that of getting the contact making parts of the several electrodes very close together on the crystal surface and another is that of maintaining electrical and mechanical stability of the characteristics of a device. The present invention is directed to an improved method of meeting these difficulties to a considerable extent so that multi-electrode and semi-conductor devices may be manufactured with precision.

In the present invention the crystal is in the form of a lamina and electrodes bear on opposite sides of the lamina. There may be a single electrode on each side of the lamina or a plurality of electrodes on one side and a single electrode on the other side or a plurality of electrodes on both sides, the number of electrodes being those necessary for the operation of the device to simulate a triode or other form of multi-electrode valve. The lamina, which may have a thickness of 1 or only a few mils, is supported in a manner that allows access to both sides of it and is secured to its support in a non-rectifying manner such as by plating or soldering. The lamina may be formed in a number of ways such as by cutting a thin layer of the crystal metal and grinding one surface to produce a desired thickness after it has been secured to its support, rolling the metal, if the metal is suitable, to a thin foil or by chemical means such as etching and eroding to a desired thickness or by vapour deposition of the crystal metal on to a suitable prepared surface which is subsequently removed, this surface may be, for example, a thin layer of metal such as copper or silver which is subsequently dissolved or it may be of plastic which may be removed in an organic solvent. The lamina is supported on and secured to a metal e. g. copper annular body, the internal diameter of which may be about 1 mm. so that the unsupported part of the lamina will retain considerable strength even it is thickness is of the order of 1 mil.

Figures 1, 2, 3:
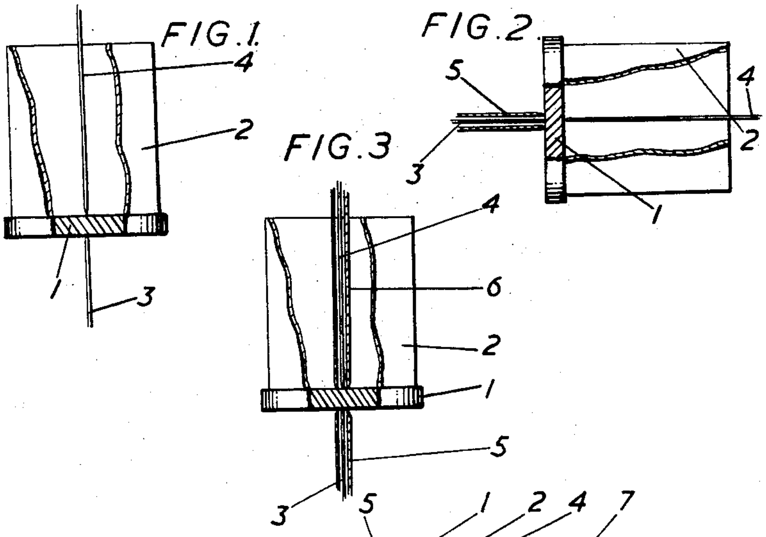

Three different embodiments of the invention will now be described by way of example with reference to the accompanying drawing in which Fig. 1 shows the electrode arrangement of a 3-electrode semi-conductor device commonly known as a crystal triode, Fig. 2 shows the electrode arrangement of a 4-electrode semi-conductor device or crystal tetrode and Fig. 3 shows the electrode arrangement of a 5-electrode semi-conductotr device or crystal pentode. The sizes of all the parts are exaggerated for the sake of clarity.

Figure 4:
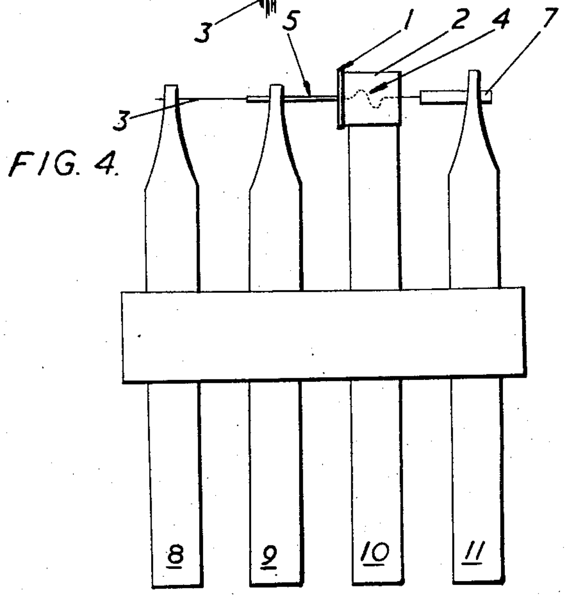
Figure 5:
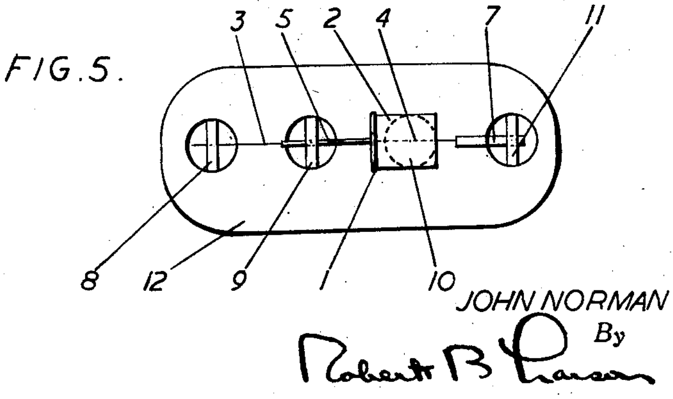

Fig. 4 shows a side view of a mounting arrangement for a semi-conductor device of the type referred to and Fig. 5 is a plan view of said mounting arrangement.

In Fig. 1 the crystal lamina of for example germanium is designated 1 and is supported by a copper cylinder 2. In the figure, part of the cylinder and attached lamina is shown in section for clarity. Two electrodes 3 and 4 which may be of the common whisker type having pointed ends are positioned, on opposite sides of the crystal lamina 1, so that they lie on a common axis, the pointed ends touching the surface of the lamina 1 at as nearly as possible opposite points on the lamina and being thus separated by a distance equal only to the thickness of the lamina, the cylinder 2 being the base electrode and the whiskers 3 and 4 the emitter and collector electrodes.

Fig. 2 illustrates an arrangement suitable for a crystal tetrode. In this case two electrodes designated 3 and 5 are positioned on one side of the crystal lamina 1 and a single electrode 4 is positioned on the opposite side of the lamina. The two electrodes designated 3 and 5 are arranged in coaxial form as an inner wire within a fine bore tube and insulated from it, the inner wire making point contact with the lamina and the tube making a circle or arcuate contact with the same surface of the lamina and electrode 4 is a single wire positioned on the opposite side of the lamina to the electrodes 3 and 5 and with its point making contact with the lamina as nearly as possible opposite the electrode 3.

The electrode arrangement illustrated in Fig. 3 is suitable for a crystal pentode and comprises five electrodes, two electrodes on each side of a crystal lamina 1 and the base electrode 2. Each pair of electrodes has a similar form to the pair designated 3 and 5 in Fig. 2. The two pairs of electrodes 3 and 5 and 4 and 6 are arranged so that the point electrode 4 is as nearly as possible exactly opposite electrode 3 and electrode 5 as nearly as possible opposite electrode 6.

In Figs. 4 and 5 the crystal contact device is of the four electrode type as shown in Fig. 2 the whisker electrode 4 being attached to a short metal rod 7. The supporting arrangement comprises four metal rods 8, 9, 10 and 11 rigidly supported halfway along their length in a block of insulating material designated 12 in the figure. The rods designated 8, 9 and 11 are ground at one end so as to have a rectangular cross section as shown in Fig. 5 and support respectively inner wire electrode 3, hollow outer electrode 5 co-axial with electrode 3 and the rod 7 to which electrode 4 is attached, holes being bored in the rods near the ends large enough to enable the respective electrodes to be pushed through the required distance but not so large as to permit any movement of the electrodes after they have been pushed in position.

The characteristics of the device described will depend on the size and pressure of the electrodes, on the metal of the crystal and on the thickness of the lamina.

What is claimed is:

1. An electric semi-conductor device comprising a semi-conducting body in the form of a lamina of the same thickness over the whole of its area, the thickness of the lamina being not more than five mils, an open-ended hollow metallic cylinder on which the lamina is mounted by being secured conductively to one end thereof to block the opening at said one end, and a plurality of co-axially disposed electrodes making contact with each side of the lamina, the electrodes making contact with one side of the lamina being positioned directly opposite correspondingly disposed electrodes making contact with the other side.

2. An electric semi-conductor device comprising a semi-conducting body in the form of a lamina of the same thickness over the whole of its area, the thickness of the lamina being not more than five mils, an open-ended hollow metallic cylinder on which the lamina is mounted by being secured conductively to one end thereof to block the opening at said one end, a single electrode on one side of the lamina making point contact with the lamina, and a plurality of electrodes on the other side of the lamina comprising an electrode in the form of a metal tube of fine bore one end of which makes circular or arcuate contact with the lamina and an inner electrode in the form of a thin wire which is co-axially mounted in but insulated from said metal tube and one end of which makes point contact with the lamina, the point of contact of said single electrode being substantially directly opposite the point of contact of said inner electrode.

References Cited in the file of this patent

UNITED STATES PATENTS

| | | |
|---|---|---|
| 2,560,579 | Kock et al. | July 17, 1951 |
| 2,608,722 | Stuetzer | Sept. 2, 1952 |
| 2,677,079 | McCreary | Apr. 27, 1954 |
| 2,677,793 | Koury | May 4, 1954 |
| 2,697,189 | Stelmak | Dec. 14, 1954 |
| 2,765,516 | Haegele | Oct. 9, 1956 |
| 2,776,381 | Baldwin | Jan. 1, 1957 |
| 2,791,703 | Pantchechnikoff | May 7, 1957 |